UNITED STATES PATENT OFFICE.

FRANK A. STRAUSS, OF WILKES-BARRE, PENNSYLVANIA.

PRODUCTION OF NITRILES AND ACIDS.

1,367,898.  Specification of Letters Patent.  Patented Feb. 8, 1921.

No Drawing.  Application filed January 10, 1920. Serial No. 350,652.

*To all whom it may concern:*

Be it known that I, FRANK A. STRAUSS, a citizen of the United States, residing at Wilkes-Barre, in the county of Luzerne and State of Pennsylvania, have invented certain new and useful Improvements in the Production of Nitriles and Acids, of which the following is a specification.

This invention relates to the production of nitriles and acids therefrom, and more particularly it relates to the production of benzonitrile and benzoic acid; and it comprises a method of producing nitriles wherein a sulfonate of an aromatic hydrocarbon and a cyanid are mixed in the usual manner, and an inert material, such as common sand, is added to the reaction mixture in an amount equal to from 60 per cent. to 100 per cent. by weight of the reaction mixture; all as more fully hereinafter set forth and as claimed.

In the manufacture of benzoic acid, or similar acids, a sulfonate of benzene, or other corresponding aromatic hydrocarbon, is mixed with the corresponding cyanid and heated to produce a nitrile of the aromatic hydrocarbon and a sulfite corresponding to the sulfonate employed. The nitrile may be hydrolyzed with acid or with alkali to produce the corresponding acid and ammonia. Thus the treatment of benzonitrile produces benzoic acid and ammonia. The first reaction, to produce the nitrile, gives but very small yields. For example, when sodium benzene sulfonate and sodium cyanid in equimolecular quantities are heated to produce benzonitrile and sodium sulfite, the yield of benzonitrile is about 33.6 per cent. of that theoretically possible.

The reaction is exothermic. I have found that the addition of inert materials, such as common sand, materially increases the yield of benzonitrile. The inert material may advantageously be added in from about 60 to 100 per cent. of the weight of the mixture of the cyanid and sulfonate. In treating sodium benzene sulfonate and sodium cyanid, I find it advantageous to employ sand of about 40 mesh in an amount equivalent to substantially 70 per cent. of the weight of the reaction mixture.

Instead of the use of sand, or other added inert material, it is possible to use the impurities present in the crude cyanid made in some of the commercial processes of manufacturing cyanids. For instance, the crude cyanid of sodium made by heating a mixture of soda ash and carbon with nitrogen, either with or without a catalyzer, contains substantially the desired proportions of inert material in the form of impurities. The same is true of the crude sodium cyanid made by heating calcium cyanamid with common salt and carbon. I may also employ the crude barium cyanid formed by heating barium carbid with nitrogen, or the crude cyanid obtained in certain blast furnace processes, where the volatilized cyanid is obtained mixed with various types of flue dust.

The following typical example of the invention is set forth as illustrative of the process. Pure sodium cyanid and pure sodium benzene sulfonate are mixed in molecular quantities and sand, of about 40 mesh, is added to the extent of 70 per cent. of the weight of the reaction mixture. The mixture is heated sufficiently to start the reaction, and may be heated during the reaction, if necessary. The reaction is exothermic and the addition of the sand, or other inert material, serves to moderate the resulting temperature and decreases undesired side reactions, increasing the yield of benzonitrile. The amount of inert material employed may be varied within certain limits and I have found that the proportions may be varied from about 60 to 100 per cent. of the weight of the mixture of sodium cyanid and sodium benzene sulfonate. However, the best proportion of inert material is about 70 per cent. of the weight of the reaction mixture.

As stated, instead of adding the inert material to the pure cyanid and sulfonate, some commercial forms of cyanid containing sufficient inert material in the form of impurities can be employed.

It is to be understood that the invention is not restricted to the treatment of sodium benzene sulfonate, but that compounds including other alkali or alkaline earth metals may be used in place of the sodium compounds and that the process may be performed in connection with the sulfonates of other aromatic hydrocarbons. Other cyanids, such as potassium cyanid or potassium ferrocyanid should be understood as equivalents of sodium cyanid.

The action of the inert material is not catalytic. The presence of the inert material serves to modify the resulting temperature due to the exothermic reaction of the sulfonate and cyanid. This moderation of temperature decreases undesired side reactions and increases the yield of the nitrile. The use of the inert material also results in a big gain from the manufacturing standpoint, as it facilitates mixing when carried out in a ball mill or similar device.

It is to be understood that the invention is not limited to the specific materials, and proportions of materials, set forth herein, but that known chemical equivalents may be used in place of the materials mentioned and that changes in the details of the process may be resorted to all without departing from the spirit of the invention or the scope of the subjoined claims.

What I claim is:

1. The process of producting nitriles of aromatic hydrocarbons which comprises heating a sulfonate of an aromatic hydrocarbon and a cyanid in the presence of an inert material.

2. The process of producing nitriles of aromatic hydrocarbons which comprises heating a sulfonate of an aromatic hydrocarbon and a cyanid in the presence of sand.

3. The process of producing nitriles of aromatic hydrocarbons which comprises heating a sodium sulfonate of an aromatic hydrocarbon and sodium cyanid in the presence of an inert material.

4. The process of producing nitriles of aromatic hydrocarbons which comprises heating a sodium sulfonate of an aromatic hydrocarbon and sodium cyanid in the presence of sand.

5. The process of producing benzonitrile which comprises heating a sulfonate of benzene with the corresponding cyanid in the presence of inert material.

6. The process of producing benzonitrile which comprises heating a sulfonate of benzene with the corresponding cyanid in the presence of sand, the sand being present in the proportion of from about 60 per cent. to 100 per cent. of the reaction mixture.

7. The process of producing benzonitrile which comprises heating a sulfonate of benzene and the corresponding cyanid in the presence of sand, the sand being present in about the proportion of 70 per cent. by weight of the reaction mixture.

8. The process of producing benzonitrile which comprises heating sodium benzene sulfonate with sodium cyanid in the presence of inert material.

9. The process of producing benzonitrile which comprises heating sodium benzene sulfonate with sodium cyanid in the presence of sand, the sand being present in the proportion of from about 60 to 100 per cent. of the reaction mixture.

10. In the production of benzoic acid from a sulfonate of benzene and a cyanid, the step which comprises adding inert material to the mixture of the sulfonate and the cyanid.

11. In the production of benzoic acid from a sulfonate of benzene and a cyanid, the step which comprises adding sand to the mixture of the sulfonate and the cyanid.

12. In the production of benzoic acid from sodium benzene sulfonate and sodium cyanid, the step which comprises adding inert material to the mixture of the sulfonate and the cyanid.

13. In the production of benzoic acid from sodium benzene sulfonate and sodium cyanid, the step which comprises adding sand to the mixture of the sulfonate and the cyanid.

14. In the production of benzoic acid from a sulfonate of benzene and a cyanid, the step which comprises adding substantially 70 per cent. by weight of sand, to the mixture of the sulfonate and the cyanid.

In testimony whereof I affix my signature in presence of two witnesses.

FRANK A. STRAUSS.

Witnesses:
A. W. HIXSON,
WALTER GOLLAND.